Figure 1:
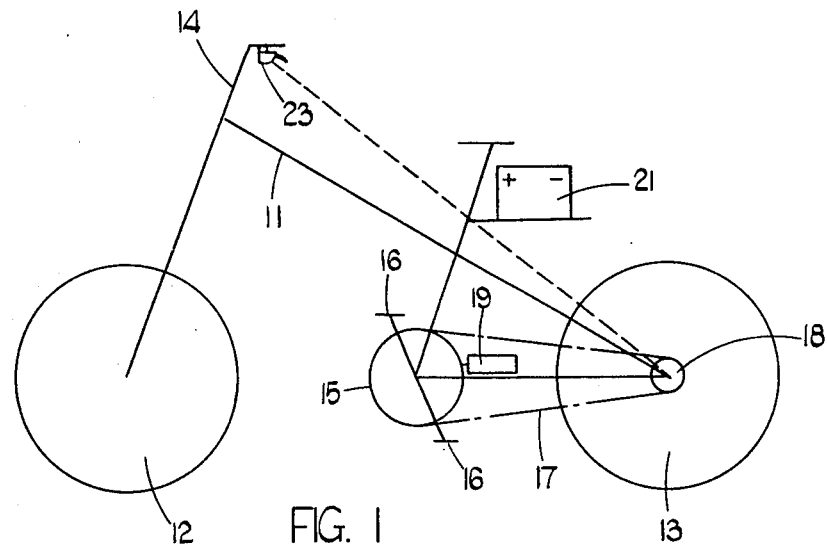

United States Patent [19]

Leighton et al.

[11] 4,072,204
[45] Feb. 7, 1978

[54] CYCLE GEAR SELECTOR

[75] Inventors: Peter Watson Leighton, Burnly; Charles Patrick Duncan Davidson, Droitwich, both of England

[73] Assignee: Lucas Industries Limited, Birmingham, England

[21] Appl. No.: 650,872

[22] Filed: Jan. 21, 1976

[30] Foreign Application Priority Data

Jan. 21, 1975 United Kingdom ............... 2630/75

[51] Int. Cl.² .................. B62M 7/00; B62M 25/04
[52] U.S. Cl. ................................. 180/34; 74/858; 200/61.88
[58] Field of Search ............ 180/34, 65 R, 33 C; 74/489, 474 SW, 473 R; 200/61.12, 61.87, 61.88, 153 LB, 61.58 B, 264; 318/12

[56] References Cited

U.S. PATENT DOCUMENTS

| 3,104,559 | 9/1963 | Dotter | 74/781 B X |
| 3,187,462 | 6/1965 | Licitis | 200/163 LB X |
| 3,338,111 | 8/1967 | Walker | 200/61.88 X |
| 3,742,580 | 7/1973 | Sullivan | 74/489 X |
| 3,773,131 | 11/1973 | Jaulmes | 180/34 |
| 3,873,795 | 3/1975 | Leighton et al. | 200/264 |
| 3,921,745 | 11/1975 | McCulloch et al. | 180/33 C |
| 3,944,766 | 3/1976 | Wood | 200/61.58 B |
| 3,991,843 | 11/1976 | Davidson | 180/34 X |

Primary Examiner—Kenneth H. Betts
Attorney, Agent, or Firm—Holman & Stern

[57] ABSTRACT

A gear selector for use on an electrically assisted cycle includes a body which is arranged to be secured to the frame of the cycle. A lever is movable manually relative to the body and is arranged to be connected to the gear mechanism of the cycle whereby movement of the lever relative to the body causes operation of the gear mechanism to change the gear ratio. A cam is movable with the lever and a cam follower engages the cam and is moved thereby. An electrical switch carried by the body and operated by movement of the cam follower, and the cam is such that the cam follower is moved to operate the switch during any movement of the lever to effect a change in gear ratio. The cam is also such that the switch is returned to its initial operative condition after the movement which effects the gear change. In an electrically assisted cycle utilizing such a gear selector mechanism the switch controls energization of the electric motor such that the motor is not energized during gear change operations.

4 Claims, 4 Drawing Figures

CYCLE GEAR SELECTOR

This invention relates to a gear selector for an electrically assisted cycle, particularly but not exclusively a bicycle, utilizing a gear mechanism of the kind which requires rotation of the input member to cease during a gear change, and the invention further relates to an electrically assisted cycle utilizing such a selector.

An electrically assisted cycle of the type for which the present invention provides improvement is disclosed in U.S. Pat. No. 3,991,843, the cycle of the said patent requiring an operator thereof to manually change gears and to disengage the electrical motor from driving relation with the ground-engaging wheels immediately prior to changing of the gears. The present invention provides a switch mechanism operable with the well-known gear selector on such a cycle which automatically de-energizes the motor during the gear change and re-energizes the motor after the gear change has occurred.

A cycle gear selector according to the invention includes, a body arranged to be secured to the frame of the cycle, a manually movable lever pivotally mounted on the body and arranged to be connected to the gear mechanism of the cycle whereby movement of the lever relative to the body causes operation of the gear mechanism to change the gear ratio between the input and output members of the mechanism, a cam movable with the lever relative to the body, a cam follower engaging said cam and an electrical switch carried by the body and operated by movement of said cam follower, said cam being such that said cam follower is moved thereby to operate said switch during any movement of the lever to effect a change in gear ratio in said mechanism, said cam further being such that the switch is returned to its initial operative condition after the movement which effects the gear change.

Preferably said cam and cam follower constitute a detent mechanism for retaining the lever in anyone of a plurality of positions relative to said body, said positions being related to different gear ratio conditions of said gear mechanism.

Desirably said switch is normally open and is closed by movement of the lever to effect a gear change.

Preferably said switch includes a fixed electrical contact, a movable electrical contact, and a switching element engaged between the fixed and movable contacts, said element comprising a block of resilient electrically insulating material containing conductive particles which in the rest condition of the element are held out of contact by the insulating material, but which upon compression of the element, are moved into contact to establish conductive paths through the element to electrically interconnect the fixed and movable contacts.

The invention further resides in an electrically assisted cycle including a frame, a ground engaging wheel rotatably supported by the frame, a rotatable drive member rotatably mounted on the frame and arranged to be rotated by the rider of the cycle, a gear mechanism carried by the wheel and having an input member, the mechanism being of the kind requiring the input member not to be driven during gear changes, an endless non-extensible, flexible member coupling said drive member to said gear input member, whereby rotation of said drive member propels the cycle, an electric motor and an associated power source carried by the frame, means transmitting rotational movement of the output of said motor to said gear mechanism input member whereby said motor can propel said cycle, and a gear selector as specified above, the body of the gear selector being secured to the cycle frame, the lever of the selector being coupled to the gear mechanism and said electrical switch being associated with said electric motor in such a manner that operation of the switch during gear changes causes de-energisation of the motor.

Preferably said motor output is coupled to said gear mechanism input member by way of said rotatable drive member and said endless member.

Figure 2:
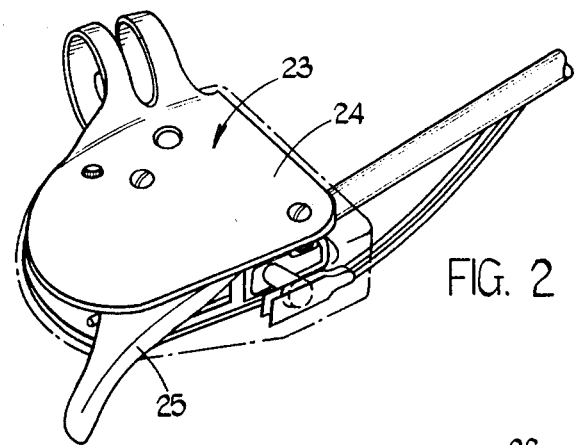
Figure 4:
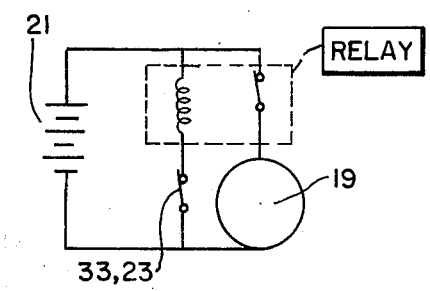
Figure 3:
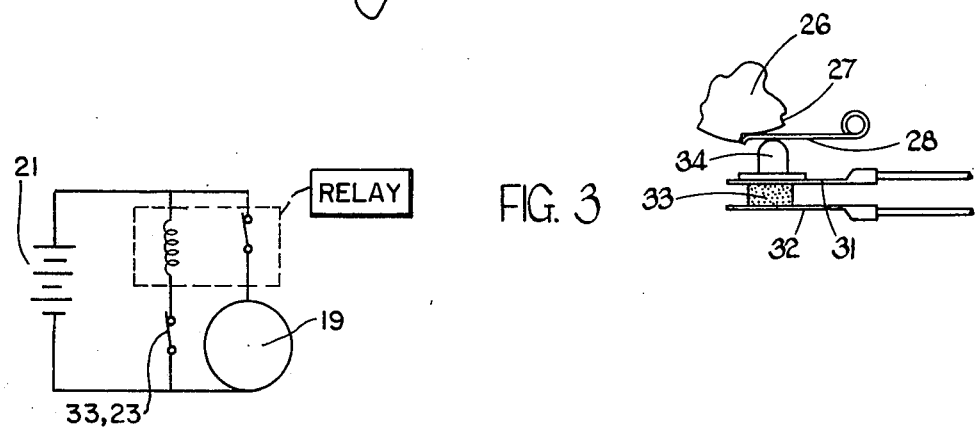

One example of the invention is illustrated in the accompanying drawings wherein, FIG. 1 is a diagrammatic representation of an electrically assisted pedal bicycle, FIG. 2 is a partly diagrammatic perspective view of a gear selector of the bicycle shown in FIG. 1, FIG. 3 is a diagrammatic, partly sectional view of an electrical switch incorporated in the gear selector of FIG. 2, and FIG. 4 is a diagram of part of the electrical circuit of the cycle.

Referring to the drawings, the bicycle includes a frame 11 constructed from metal tube in the usual manner. Rotatably mounted on the frame 11 are first and second ground engaging wheels 12, 13 the wheel 12 being steerable by way of the handle bars 14 of the frame 11, and the wheel 13 being a driving wheel. Also rotatably mounted on the frame is a toothed chain wheel 15 having connected thereto pedals 16 whereby the chain wheel 15 can be rotated by the rider of the cycle to propel the cycle. An endless, non-extensible, flexible chain 17 couples the toothed chain wheel 15 to a toothed pinion 18 associated with the driving wheel 13. The toothed pinion 18 constitutes the input of a hub gear mechanism of the Sturmey Archer type and the arrangement is conventional in that rotation of the chain wheel 15 is transmitted by the chain 17, the pinion 18, and the hub gear mechanism to the wheel 13 to rotate the wheel 13 at a speed determined by the numbers of teeth on the chain wheel 15 and the pinion 18, and the gear ratio of the hub gear mechanism.

Secured to the frame 11 is an electric motor 19 the output member of which is coupled to the chain wheel 15 in any convenient manner whereby rotation of the output member of the motor 19 causes rotation of the chain wheel 15, so that the motor 19 propels the cycle. A carrier secured to the frame 11 supports an electric storage battery 21 and upon completion of an electrical circuit between the battery 21 and the motor 19 the motor 19 is energised and propels the cycle.

Control of the hub gear mechanism is effected by way of a gear selector 23 mounted on the handle bars 14 of the bicycle. The gear selector 23 includes a body 24 secured to the handle bars and having pivotally mounted therein a lever 25 which projects from the body for manual operation. The lever 25 is coupled to the hub gear mechanism 18 by way of a Bowden cable so that pivotal movement of the lever 25 relative to the body 24 between a plurality of predetermined positions causes predetermined changes in the gear ratio between the input pinion 18 and the wheel 13. The lever 25 carries with it a cam member 26 (FIG. 3) having in its periphery a plurality of spaced recesses 27. Carried by the body 24 and biased by its own inherent resilience into engagement with the cam 26 is a cam follower 28 the free end of which can engage in any one of the recesses 27 in the cam 26. The cam 26 and cam follower 28 together define a detent mechanism retaining the lever 25 in any one of a plurality of predetermined positions relative to the body 24, the predetermined positions of the lever 25 corresponding to different gear settings of the hub gear mechanism.

It is known that with hub gear mechanisms of the Sturmey Archer type in order to effect a change in gearing between the input and output members of the mechanism, the input member should not be subject to driving force. A manually operated control switch is associated with the motor 19 for controlling energisation thereof, and it will be understood that in the absence of any other switching mechanism then when the manually operable control switch is closed the motor will be energised. Thus since during a gear change the pinion 18 should not be subject to driving force then it follows that the motor 19 must be de-energised during a gear change. The de-energisation of the motor during a gear change could be effected by simultaneous operation, by the rider, of the manual control switch. However, such an arrangement is clearly undesirable since it requires the rider to perform two separate manual operations simultaneously while at the same time retaining control of the cycle. Thus a switch is incorporated into the gear selector 23 whereby de-energisation of the motor 19 can be effected automatically during gear changes.

Secured to the body 24 of the selector 23 are first and second leaf spring electrical contacts 31, 32 respectively. The leaf spring contacts 31, 32 are held apart by a switching element 33 in the form of a block of an electrically insulating elastomer loaded with conductive particles. The loading of the conductive particles within the elastomer block is such that when the block is in a rest, unstressed condition then the particles are held out of contact with one another and the block constitutes an electrical insulator, while when the block is compressed the particles are moved into contact with one another to establish conductive paths through the block. The leaf spring contacts 31, 32 are positioned adjacent the cam follower 28, and an electrically insulating plunger 34 secured to the leaf spring contact 31 abuts the cam follower 28. The leaf spring contact 32 is rigidly supported, and movement of the cam follower 28 as a result of the cam follower 28 riding out of a recess in the cam 26 causes flexure of the leaf spring contact 31 towards the leaf spring contact 32 compressing the element 33. Thus in any one of the predetermined positions of the lever 25 the cam follower 28 is engaged in a recess in the cam 26 and the switching element 32 is in its relaxed, and therefore non-conductive condition. However, immediately when a gear change commences the follower 28 is forced out of the recess in the cam 26 and by way of the plunger 34 flexes the contact 31 towards the contact 32 compressing the element 33 and so rendering the element 33 conductive. Upon reaching the next predetermined position the cam 26 of the lever 25 presents a further recess to the cam follower 28 and the cam follower 28 moves into the recess permitting restoration of the contact 31 and returning the element 33 to its non-conductive condition. Thus at the commencement, and termination of a gear change operation the element 33 is non-conductive, but during the gear change operation the element 33 is conductive and electrically interconnects the leaf spring contacts 31, 32. The leaf spring contacts 31, 32 are electrically connected in the energising circuit of a relay which when energised breaks the electrical circuit of the motor 19. Thus while the element 33 is non-conductive the motor 19 can be energised and de-energised under the control of the manually operable switch, and any other switches which may be required. However, when the element 33 is conductive the associated relay breaks the motor circuit so that the motor is de-energised for the duration of the gear change operation.

The cycle may also include a manually operable switch also controlling energisation of the motor and it will be recognised that the manually operable switch must be operated to energise the motor regardless of the position of the gear selector lever. In addition the cycle can, if desired incorporate a switch controlling energisation of the motor and operated by the application, by the rider, of driving force so that the cycle cannot be propelled solely by the motor. For example the switch can be operated in response to the take-up of a small degree of lost motion between the pedal or pedals and the chain wheel 15. Alternatively, the switch can be operated by tension in the upper run of the chain 17 and although tension is generated in the chain by the motor it is found that in practice if the rider ceases to pedal then the motor does not maintain sufficient tension, more than momentarily, and the switch quickly breaks the motor circuit.

We claim:

1. In combination with a gear selector for a cycle assisted by an electric motor and a gear mechanism wherein rotation of the input member of said gear mechanism is caused to cease during a change of gears caused by manual operation of the gear selector, the gear selector including a body member secured to the frame of the cycle, a manually operable lever pivotally mounted to the body member and mechanically connected to the gear mechanism whereby movement of the lever relative to the body member causes a change in gear ratio between input and output members of said gear mechanism, a cam movable with the lever relative to the body member, a cam follower engaging the cam and being movable with movement of the lever to first positions whereby gears in the gear mechanism are caused to be engaged in varying gear ratios, the cam follower further being movable with movement of the lever to second positions whereby the gears in the gear mechanism are disengaged from effective mechanical contact with ground-engaging rotary portions of the cycle, an electrical energization circuit including the motor and a source of electrical energy, the improvement comprising:

switch means carried by the body member for controlling the flow of electrical current within the energization circuit, the switch means including electrical contact members normally positioned to permit the flow of electrical energy through the energization circuit, at least one of the electrical contact members being displaced by the movement of the cam follower when said cam follower moves into one of said second positions to cause interruption of the flow of electrical energy through the energization circuit, said displaced electrical contact member returning to normal position when the cam follower returns to one of said first positions, movement of the lever effecting a gear ratio change in the gear mechanism and at the same time sequentially interrupting and then re-establishing the flow of electrical energy to the energization circuit.

2. The apparatus of claim 1 wherein the electrical contact members comprise spaced leaf contact members and a compressible electrical contact member disposed between the leaf contact members, the compressible electrical contact member being electrically conductive when compressed and electrically non-conductive when not compressed, the switch means further comprising:

plunger means for mechanically connecting the cam follower and a first one of the leaf contact members, the plunger means being disposed between said cam follower and said first one of the leaf contact members, the plunger means being displaceable on movement of the cam follower to displace at least the first one of the leaf contact members toward the other said leaf contact member, thereby to compress the compressible electrical contact member therebetween to cause electrical energy to flow between said contact members and to cause flow of electrical energy witin the energization circuit to be interrupted, the first one of the leaf contact members and the compressible electrical contact member returning to a normal electrically non-conducting position when the cam follower returns to one of said first positions thereof.

3. The apparatus of claim 2 wherein the cam has a plurality of spaced recesses formed thereon, the cam follower engaging within said recesses in said first positions thereof and engaging surfaces of the cam between said recesses in the second positions thereof, the cam follower being displaced toward the plunger means in said second positions to displace said plunger means toward the first one of the leaf contact members adjacent to said plunger means.

4. The apparatus of claim 1 wherein the contact members of the switch means include a fixed electrical contact, a movable electrical contact, and a switching element engaged between the fixed and movable contacts, said element comprising a block of resilient electrically insulating material containing conductive particles which in the rest condition of the element are held out of contact by the insulating material but which, upon compression of the element, are moved into contact to establish conductive paths through the element to electrically interconnect the fixed and movable contacts.

* * * * *